United States Patent
He

(10) Patent No.: US 9,715,059 B2
(45) Date of Patent: Jul. 25, 2017

(54) LIGHT GUIDE PLATE, METHOD FOR MANUFACTURING SAME AND BACKLIGHT MODULE

(71) Applicant: SHENZHEN CHINA STAR OPTOELECTRONICS TECHNOLOGY CO., LTD., Shenzhen, Guangdong (CN)

(72) Inventor: Hu He, Guangdong (CN)

(73) Assignee: SHENZHEN CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 14/777,121

(22) PCT Filed: Jan. 17, 2014

(86) PCT No.: PCT/CN2014/070842
§ 371 (c)(1),
(2) Date: Oct. 1, 2015

(87) PCT Pub. No.: WO2015/089929
PCT Pub. Date: Jun. 25, 2015

(65) Prior Publication Data
US 2016/0282548 A1    Sep. 29, 2016

(30) Foreign Application Priority Data
Dec. 20, 2013    (CN) .......................... 2013 1 0714892

(51) Int. Cl.
G02B 6/00 (2006.01)
F21V 8/00 (2006.01)
G02F 1/1335 (2006.01)

(52) U.S. Cl.
CPC ......... G02B 6/0088 (2013.01); G02B 6/0065 (2013.01); G02B 6/0036 (2013.01);
(Continued)

(58) Field of Classification Search
CPC ................ G02B 6/0088; G02B 6/0036; G02F 1/133615
See application file for complete search history.

(56) References Cited

U.S. PATENT DOCUMENTS

2003/0164913 A1*  9/2003  Ogawa ................. G02B 6/0088
                                               349/113
2007/0086213 A1*  4/2007  Hsieh .................. G02B 6/0088
                                               362/633
(Continued)

FOREIGN PATENT DOCUMENTS

CN    101490470 A    7/2009
CN    101975360 A    2/2011
(Continued)

OTHER PUBLICATIONS

Wang Gao, the International Searching Authority written comments, Sep. 2014, CN.

*Primary Examiner* — Julie Bannan

(57) ABSTRACT

The present invention discloses a light guide plate fixed to a back plate. The back plate has a plurality of fixing portions. The light guide plate includes a light incident surface, a reflective surface connected with the light incident surface, and a light output surface opposite to the reflective surface and connected with the light incident surface. The light output surface includes a main body and a plurality of locating portions mounted on the main body. The locating portions correspond to the fixing portions. The locating portions mate with the corresponding fixing portions thereby fixing the light guide plate to the back plate. A blank area is formed on the main body at each location where each of the (Continued)

locating portions mating with the corresponding fixing portion. A plurality of microstructures are formed on the rest area excluding the blank areas in the main body.

8 Claims, 7 Drawing Sheets

(52) U.S. Cl.
 CPC .......... *G02B 6/0055* (2013.01); *G02B 6/0068* (2013.01); *G02B 6/0073* (2013.01); *G02F 1/133615* (2013.01)

(56) References Cited

U.S. PATENT DOCUMENTS

| | | | | |
|---|---|---|---|---|
| 2007/0115691 | A1* | 5/2007 | Yu | G02B 6/0091 362/632 |
| 2008/0106674 | A1* | 5/2008 | Hsiao | G02B 6/0031 349/65 |
| 2009/0103004 | A1* | 4/2009 | Su | G02F 1/133608 349/62 |
| 2010/0296021 | A1 | 11/2010 | Jung et al. | |
| 2013/0083270 | A1 | 4/2013 | Obata et al. | |
| 2014/0071377 | A1* | 3/2014 | Scardato | G02F 1/133308 349/58 |

FOREIGN PATENT DOCUMENTS

| | | | | |
|---|---|---|---|---|
| CN | 102081186 A | 6/2011 | | |
| CN | 202631777 U | 12/2012 | | |
| CN | 203250042 U | 10/2013 | | |
| JP | 2006-185891 A | 7/2006 | | |
| JP | WO 2012023484 A1 * | 2/2012 | ........... | G02B 6/0088 |
| KR | 10-2013-0051130 A | 5/2013 | | |
| WO | WO2013035610 A1 | 3/2013 | | |

\* cited by examiner

LIGHT GUIDE PLATE, METHOD FOR MANUFACTURING SAME AND BACKLIGHT MODULE

FIELD OF THE INVENTION

The present invention relates to display technologies, and particularly, to a light guide plate, a method for manufacturing the light guide plate, and a backlight module having the light guide plate.

BACKGROUND OF THE INVENTION

In recent years, because liquid crystal displays (LCDs) have many excellent performance characteristics, such as large-scale information display ability, easy colorization, low power consumption, and long life, they are extensively used in a variety of electronic devices, such as notebooks, computers, and LCD televisions. However, LCDs are passive components, and are not self-luminescent, therefore, backlight modules are typically required. The backlight module includes a light guide plate. The light guide plate is used to convert linear light sources or point sources, such as cold cathode ray tubes or light emitting diodes (LEDs), respectively, into area light sources with high uniformity and brightness.

Generally, backlight modules can be categorized as either direct-type backlight modules or edge-type backlight modules, according to the positions of LEDs. A light guide plate in an edge-type backlight module includes a light incident surface, a reflective surface adjoining the light incident surface, and a light output surface opposite to the reflective surface. A plurality of LEDs arranged in a straight line face and emit light toward the light incident surface. In order to increase the uniformity and the luminous efficiency of light emitting out of the backlight modules, a plurality of microstructures are formed on the light output surface, such as a plurality of lenticular structures substantially parallel to each other. The straight line is substantially perpendicular to the extension direction of the lenticular structures. In application, the light guide plate is fixed to a back plate in a manner that a protrusion or a groove, served as a locating portion and formed in the light guide plate, engages with a groove or a protrusion served as an engagement portion and formed in a back plate. The protrusion or the groove in the light guide plate may destroy the lenticular structures. Light emitting from the LEDs will be scattered when reaches the destroyed lenticular structures, and light leakage from the light guide plate will be occurred. This influences the quality of the backlight module.

Therefore, it is desired to provide a light guide plate, a method for manufacturing the light guide plate, and a backlight module having the light guide plate, which can overcome or at least alleviate the above-mentioned problem.

SUMMARY OF THE INVENTION

To solve the above-mentioned problem, the present invention provides a light guide plate. The light guide plate is fixed to a back plate having a plurality of fixing portions. The light guide plate includes a light incident surface, a reflective surface connected with the light incident surface, and a light output surface opposite to the reflective surface and connected with the light incident surface. The light output surface includes a main body and a plurality of locating portions mounted on the main body. The locating portions correspond to the fixing portions. The locating portions mate with the corresponding fixing portions thereby fixing the light guide plate to the back plate. A blank area is formed on the main body at each location where each of the locating portions mating with the corresponding fixing portion. A plurality of microstructures are formed on the rest area excluding the blank areas in the main body.

Wherein, the microstructures are prisms which are substantially parallel to each other along the lengthwise direction of the light output surface.

Wherein, the cross-section of each of the prisms along a direction perpendicular to the light output surface is substantially triangular or semicircular.

Wherein, the fixing portions are engagement grooves, the locating portions are protrusions extending outwardly from opposite sides of the main body, the protrusions engage in the corresponding engagement grooves thereby fixing the light guide plate to the back plate, the engagement grooves, the protrusions, and blank areas are substantially rectangular, each of the blank area corresponds to an engagement groove and a protrusion, each of the blank areas directly faces the corresponding engagement groove, and is spaced apart from the corresponding protrusion, and the length of each of the blank areas is larger than the width of the corresponding engagement groove, and a plurality of microstructures are formed on the protrusions.

Wherein, the fixing portions are engagement grooves, the locating portions are protrusions extending outwardly from opposite sides of the main body, the protrusions engage in the corresponding engagement grooves thereby fixing the light guide plate to the back plate, the engagement grooves and the protrusions are substantially rectangular, blank areas are substantially quadrilateral, every two blank areas correspond to an engagement groove and a protrusion, the every two blank areas are symmetrical relative to the corresponding protrusion, the area between the every two blank areas comprises a first trapezoidal portion connected with the corresponding protrusion and a second trapezoidal portion connected to the first trapezoidal portion, distance between an outmost side of one of the every two blank areas and an outmost side of the other one of the every two blank areas is larger than the width of the corresponding engagement groove, and a plurality of microstructures are formed on the protrusions.

Wherein, the fixing portions are engagement grooves, the locating portions are protrusions extending outwardly from opposite sides of the main body, the protrusions engage in the corresponding engagement grooves thereby fixing the light guide plate to the back plate, the engagement grooves and the protrusions are substantially rectangular, every two blank areas correspond to an engagement groove and a protrusion, the every two blank areas are symmetrical relative to the corresponding protrusion, the area between the every two blank areas is substantially a triangular area, a bottom edge of the triangular area is connected to the corresponding protrusion, distance between an outmost side of one of the every two blank areas and an outmost side of the other one of the every two blank areas is larger than the width of the corresponding engagement groove, and a plurality of microstructures are formed on the protrusions.

Wherein, the fixing portions are engagement grooves, the locating portions are protrusions extending outwardly from opposite sides of the main body, the protrusions engage in the corresponding engagement grooves thereby fixing the light guide plate to the back plate, the engagement grooves and the protrusions are substantially trapezoid, every two blank areas correspond to an engagement groove and a protrusion, the every two blank areas are symmetrical relative to the corresponding protrusion, the area between the every two blank areas is substantially trapezoid, distance between an outmost side of one of the every two blank areas and an outmost side of the other one of the every two blank areas is larger than the largest width of the corresponding engagement groove, and a plurality of microstructures are formed on the protrusions.

Wherein, the fixing portions are protrusions, the locating portions are engagement grooves defining at opposite sides of the main body, the opposite sides are perpendicular to the light incident surface, the protrusions engage in the corresponding engagement grooves thereby fixing the light guide plate to the back plate, the engagement grooves are substantially U-shaped, the cross-section of each of the protrusions is substantially circular, each of the blank areas is substantially a semicircle ring-like, each of the blank areas corresponds to an engagement groove and a protrusion, each blank area directly faces the corresponding engagement groove, and the outer diameter of each blank area is larger than the largest width of the corresponding engagement groove.

Wherein, the fixing portions are protrusions, the locating portions are trapezoidal blocks with engagement grooves, the blocks extend outwardly from opposite sides of the main body, the opposite sides are perpendicular to the light incident surface, the protrusions engage in the corresponding engagement grooves thereby fixing the light guide plate to the back plate, every two blank areas correspond to an engagement groove and a protrusion, the every two blank areas are symmetrical relative to the corresponding engagement groove, the area between the every two blank areas is substantially a triangular area, a bottom edge of the triangular area is connected to the corresponding block, distance between an outmost side of one of the every two blank areas and an outmost side of the other one of the every two blank areas is larger than the width of the corresponding engagement groove, and a plurality of microstructures are formed on the blocks.

To solve the above-mentioned problem, the present invention provides a method for manufacturing the above-asserted light guide plate. The method includes the following steps: pressing an initial light guide plate having a light output surface entirely covered with microstructures, the initial light guide plate comprising a light incident surface, a reflective surface connected with the light incident surface, and a light output surface opposite to the reflective surface and connected with the light incident surface, the light output surface comprising a main body and a plurality of locating portions mounted on the main body; providing a flat metal fixture, the shape of the flat metal fixture being the same as that of each blank area; and firmly attaching the heated flat metal fixture onto microstructures corresponding to the to-be-formed blank areas, and removing the flat metal fixture until the microstructures corresponding to the to-be-formed blank areas are entirely removed.

To solve the above-mentioned problem, the present invention provides a backlight module. The backlight module includes a light guide plate fixed to the back plate and a light source assembly adjacent to and spaced apart from the light guide plate. The back plate includes a plurality of fixing portions. The light guide plate includes a light incident surface, a reflective surface connected with the light incident surface, and a light output surface opposite to the reflective surface and connected with the light incident surface. The light output surface includes a main body and a plurality of locating portions mounted on the main body. The locating portions correspond to the fixing portions. The locating portions mate with the corresponding fixing portions thereby fixing the light guide plate to the back plate. A blank area is formed on the main body at each location where each of the locating portions mating with the corresponding fixing portion. A plurality of microstructures are formed on the rest area excluding the blank areas in the main body. The light source assembly directly faces and emits light toward the light incident surface.

Wherein, the microstructures are prisms which are substantially parallel to each other along the lengthwise direction of the light output surface.

Wherein, the cross-section of each of the prisms along a direction perpendicular to the light output surface is substantially triangular or semicircular.

Wherein, the light source assembly comprises a circuit board and a plurality of light emitting diode (LED) mounted on the circuit board, the LEDs are arranged in a straight line and are spaced apart from each other, the LEDs directly face and emit light toward the light guide plate through the light incident surface, and the straight line is substantially perpendicular to the lengthwise direction of the prisms.

Wherein, the fixing portions are engagement grooves, the locating portions are protrusions extending outwardly from opposite sides of the main body, the protrusions engage in the corresponding engagement grooves thereby fixing the light guide plate to the back plate, the engagement grooves, the protrusions, and blank areas are substantially rectangular, each of the blank area corresponds to an engagement groove and a protrusion, each of the blank areas directly faces the corresponding engagement groove, and is spaced apart from the corresponding protrusion, and the length of each of the blank areas is larger than the width of the corresponding engagement groove, and a plurality of microstructures are formed on the protrusions.

Wherein, the fixing portions are engagement grooves, the locating portions are protrusions extending outwardly from opposite sides of the main body, the protrusions engage in the corresponding engagement grooves thereby fixing the light guide plate to the back plate, the engagement grooves and the protrusions are substantially rectangular, blank areas are substantially quadrilateral, every two blank areas correspond to an engagement groove and a protrusion, the every two blank areas are symmetrical relative to the corresponding protrusion, the area between the every two blank areas comprises a first trapezoidal portion connected with the corresponding protrusion and a second trapezoidal portion connected to the first trapezoidal portion, distance between an outmost side of one of the every two blank areas and an outmost side of the other one of the every two blank areas is larger than the width of the corresponding engagement groove, and a plurality of microstructures are formed on the protrusions.

Wherein, the fixing portions are engagement grooves, the locating portions are protrusions extending outwardly from opposite sides of the main body, the protrusions engage in the corresponding engagement grooves thereby fixing the light guide plate to the back plate, the engagement grooves and the protrusions are substantially rectangular, every two blank areas correspond to an engagement groove and a protrusion, the every two blank areas are symmetrical relative to the corresponding protrusion, the area between the every two blank areas is substantially a triangular area, a bottom edge of the triangular area is connected to the corresponding protrusion, distance between an outmost side of one of the every two blank areas and an outmost side of the other one of the every two blank areas is larger than the width of the corresponding engagement groove, and a plurality of microstructures are formed on the protrusions.

Wherein, the fixing portions are engagement grooves, the locating portions are protrusions extending outwardly from opposite sides of the main body, the protrusions engage in the corresponding engagement grooves thereby fixing the light guide plate to the back plate, the engagement grooves and the protrusions are substantially trapezoid, every two blank areas correspond to an engagement groove and a protrusion, the every two blank areas are symmetrical relative to the corresponding protrusion, the area between the every two blank areas is substantially trapezoid, distance between an outmost side of one of the every two blank areas and an outmost side of the other one of the every two blank areas is larger than the largest width of the corresponding engagement groove, and a plurality of microstructures are formed on the protrusions.

Wherein, the fixing portions are protrusions, the locating portions are engagement grooves defining at opposite sides of the main body, the opposite sides are perpendicular to the light incident surface, the protrusions engage in the corresponding engagement grooves thereby fixing the light guide plate to the back plate, the engagement grooves are substantially U-shaped, the cross-section of each of the protrusions is substantially circular, each of the blank areas is substantially a semicircle ring-like, each of the blank areas corresponds to an engagement groove and a protrusion, each blank area directly faces the corresponding engagement groove, and the outer diameter of each blank area is larger than the largest width of the corresponding engagement groove.

Wherein, the fixing portions are protrusions, the locating portions are trapezoidal blocks with engagement grooves, the blocks extend outwardly from opposite sides of the main body, the opposite sides are perpendicular to the light incident surface, the protrusions engage in the corresponding engagement grooves thereby fixing the light guide plate to the back plate, every two blank areas correspond to an engagement groove and a protrusion, the every two blank areas are symmetrical relative to the corresponding engagement groove, the area between the every two blank areas is substantially a triangular area, a bottom edge of the triangular area is connected to the corresponding block, distance between an outmost side of one of the every two blank areas and an outmost side of the other one of the every two blank areas is larger than the width of the corresponding engagement groove, and a plurality of microstructures are formed on the blocks.

The backlight module, the light guide plate, and the method for manufacturing the light guide plate define blank areas at locations of the main body where the fixing portions mates with the locating portions, and microstructures are formed on the rest area excluding the blank areas in the main body. Light reaching the blank areas is just totally interior reflected, and does not leak out from the light output surface. Therefore, quality of backlight module is improved.

BRIEF DESCRIPTION OF THE DRAWINGS

In order to illustrate technical schemes of the present invention or the prior art more clearly, the following section briefly introduces drawings used to describe the embodiments and prior art. Obviously, the drawing in the following descriptions just is some embodiments of the present invention. The ordinary person in the related art can acquire the other drawings according to these drawings without offering creative effort.

DETAILED DESCRIPTION OF THE PREFERRED EMBODIMENTS

The following sections offer a clear, complete description of the present invention in combination with the embodiments and accompanying drawings. Obviously, the embodiments described herein are only a part of, but not all of the embodiments of the present invention. In view of the embodiments described herein, any other embodiment obtained by the person skilled in the field without offering creative effort is included in a scope claimed by the present invention.

The First Embodiment

Figure 1:
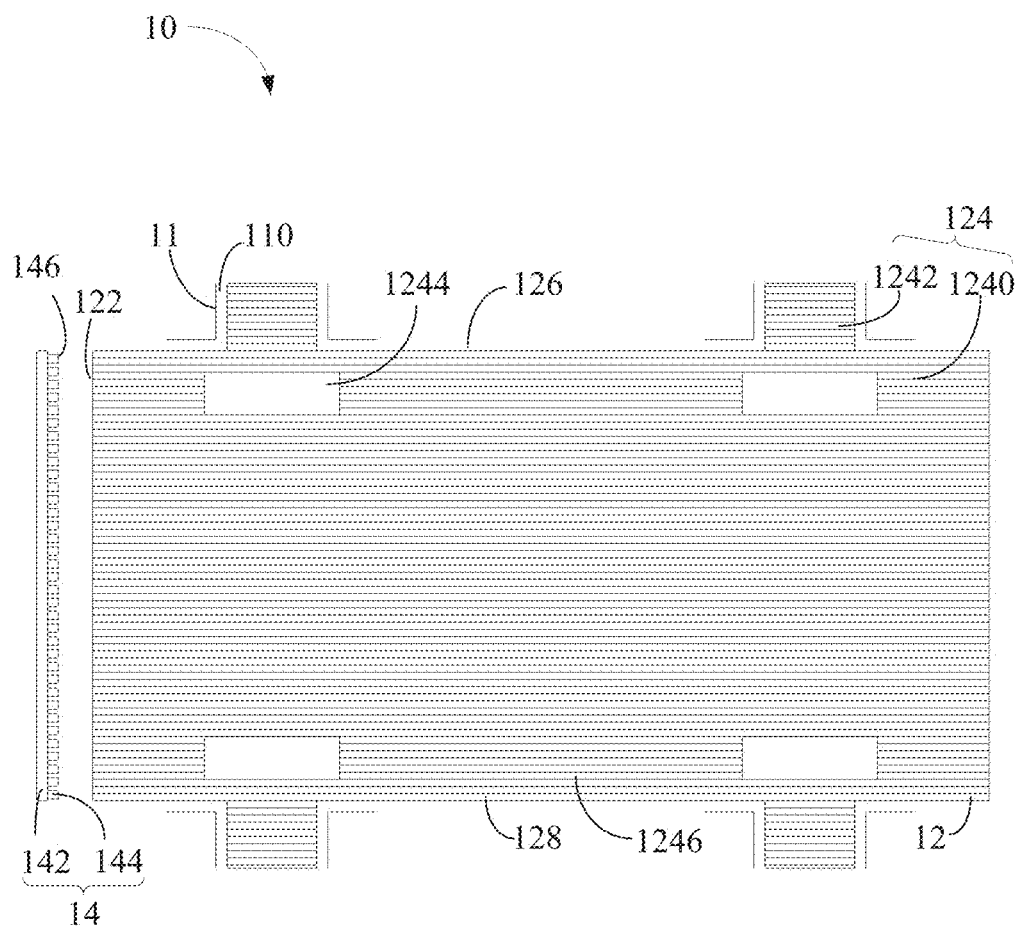
FIG. 1 is a schematic view of a backlight module in accordance with a first exemplary embodiment of the present invention.

Referring to FIG. 1, a backlight module 10, in accordance with a first embodiment, is fixed in a back plate 11. The back plate 11 defines four engagement grooves 110. In this embodiment, the four engagement grooves 110 serve as four fixing portions and are evenly distributed at opposite sides of the back plate 11. Each of the engagement grooves 110 is substantially rectangular.

The backlight module 10 includes a light guide plate 12 and a light source assembly 14. The light source assembly 14 is adjacent to and spaced apart from the light guide plate 12.

The light guide plate 12 includes a light incident surface 122, a light output surface 124, a reflective surface (not shown), a first side surface 126, and a second side surface 128. The light output surface 124 and the reflective surface are positioned at opposite sides of the light guide plate 12, and the light output surface 124 and the reflective surface are connected to the light incident surface 122. The first side surface 126 and the second side surface 128 are positioned at opposite sides of the light guide plate 12, and the first side surface 126 is substantially parallel to the second side surface 128. The first side surface 126 and the second side surface 128 are interconnected between the light output surface 124 and the reflective surface.

The light output surface 124 includes a main body 1240 and four protrusions 1242 severing as four locating portions. The main body 1240 is substantially rectangular and corresponds to a display area viewed by a user. The four protrusions 1242 correspond to the four engagement grooves 110. In detail, the four protrusions 1242 are rectangular and extend outwardly from the main body 1240. Two of the four protrusions 1242 extend from the first side surface 126, and the remaining two protrusions 1242 extend from the second side surface 128. The four protrusions 1242 engage in the corresponding engagement grooves 110 so that the light guide plate 12 is fixed to the back plate 11.

Four blank areas 1244 are formed on the main body 1240 respectively adjacent to the four locations where the four protrusions 1242 engage in the respective engagement grooves 110. A plurality of microstructures 1246 are formed on the rest area excluding the blank areas 1244 of the main body 1240. In detail, the blank areas 1244 are flat plate areas, and have no microstructures 1246 formed thereon. In this embodiment, each of the blank areas 1244 is substantially rectangular, and corresponds to an engagement groove 110 and a protrusion 1242. Each of the blank areas 1244 directly faces the corresponding engagement groove 110, and is spaced apart from the corresponding protrusion 1242. The length of each of the blank areas 1244 is larger than the width of the corresponding engagement groove 110. A plurality of microstructures 1246 are formed on the four protrusions 1242. The microstructures 1246 are prisms which are substantially parallel to each other along the lengthwise direction of the light output surface 124. The cross-section of each of the prisms along a direction perpendicular to the light output surface 124 is substantially triangular or semicircular. It is important to note that four edges of the blank areas 1244 are shown with solid lines in FIG. 1, in order to more clearly express the shape and distribution of the blank areas 1244. In fact, the solid lines do not exist. The blank areas in other embodiments are expressed in the same way as the first embodiment.

The light source assembly 14 includes a circuit board 142 and a plurality of LEDs 144 positioned on the circuit board 142. The LEDs 144 are arranged in a first straight line and are spaced apart from each other. Each of the LEDs 144 includes a light emitting surface 146. The light source assembly 14 is located adjacent to the light incident surface 122. The light emitting surfaces 146 directly face the light incident surface 122, thereby light emitting from the LEDs 144 enter the light guide plate 12 through the light incident surface 122. The first straight line is substantially perpendicular to the lengthwise direction of the each of the prisms.

When in work, light emitting from the light source assembly 14 enters he light guide plate 12 through the light incident surface 122, and is then reflected by the reflective surface, the first side surface 126, and the second side surface 128, and finally exits out of the light guide plate 12 through the light output surface 124. When light reaches the locations where the four protrusions 1242 engage in the corresponding engagement grooves 110, light will not be scattered and does not leak out from the light output surface 124 because of the blank areas 1244. Therefore, quality of the backlight module 10 is improved.

It is understood that the protrusions 1242 and the engagement grooves 110 are not limited to be four, may be at least two, such as two, three, five, or sixth, as long as the plurality of the protrusions 1242 are equal to that of the engagement grooves 110. Moreover, the distribution of the protrusions 1242 and the engagement grooves 110 can be changed, as long as the protrusions 1242 correspond to the engagement grooves 110, and the protrusions 1242 engages the corresponding engagement grooves 110 to fix the light guide plate 12 to the back plate 11.

There are two methods for manufacturing the light guide plate 12. The first method includes the following steps. First, an initial light guide plate having a light output surface entirely covered with microstructures 1246 is pressed using a roller. The structure of the initial light guide plate is the same as that of the light guide plate 12 except that the light output surface 124 of the light guide plate 12 has blank areas 1244. Then, four blank areas 1244 are formed by firmly attaching a heated flat metal fixture onto microstructures 1246 corresponding to to-be-formed blank areas 1244 for a while. In detail, the shape of the flat metal fixture is the same as that of each of the blank areas 1244. The temperature of the flat metal fixture is in a range from 150 degrees to 300 degrees. Last, the flat metal fixture is removed until the microstructures 1246 corresponding to the to-be-formed blank areas 1244 are entirely removed because of thermal deformation and pressure of the flat metal fixture.

The second method for manufacturing the light guide plate 12 includes the following steps. First, an initial light guide plate having a light output surface entirely covered with microstructures 1246 is pressed using a roller. The structure of the initial light guide plate is the same as that of the light guide plate 12 except that the light output surface 124 of the light guide plate 12 has blank areas 1244. Then, four blank areas 1244 are formed by blowing hot air toward the microstructures 1246 corresponding to to-be-formed blank areas 1244 using heat gun for a while. In detail, the temperature of hot air is in a range from 150 degrees to 400 degrees. Last, the heat gun is removed until the microstructures 1246 corresponding to the to-be-formed blank areas 1244 are entirely removed because of thermal deformation and pressure of the hot air.

The Second Embodiment

Figure 2:
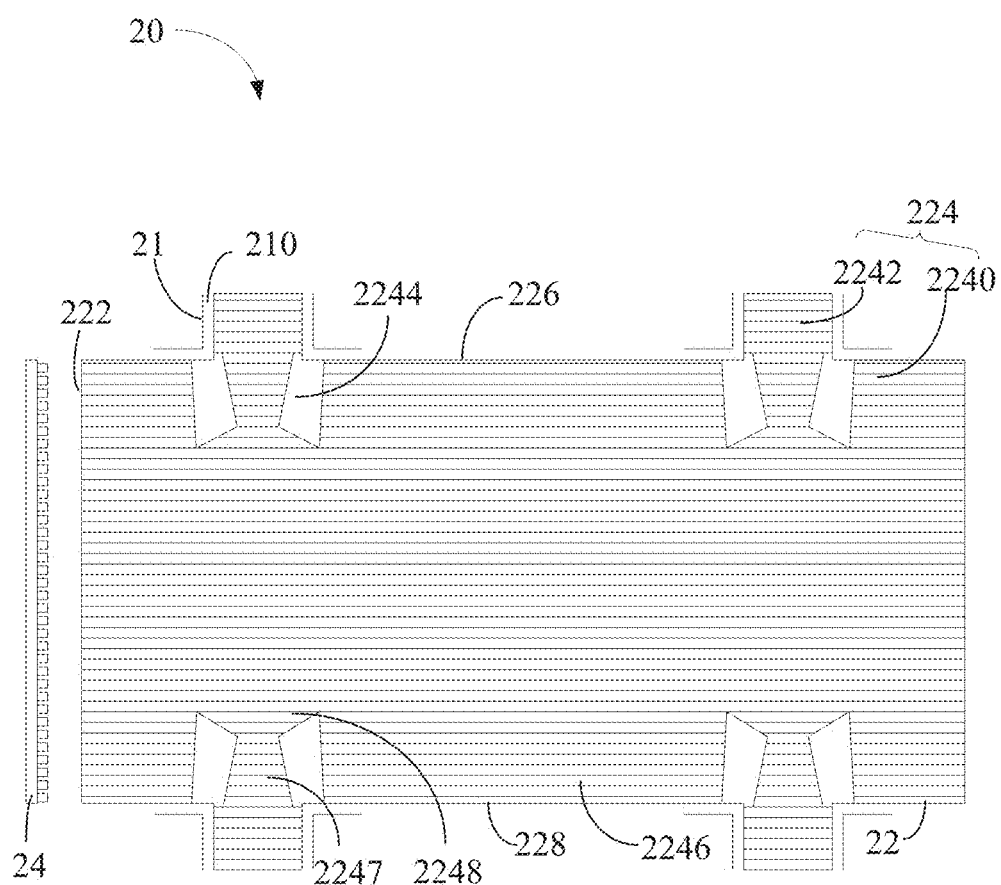
FIG. 2 is a schematic view of a backlight module in accordance with a second exemplary embodiment of the present invention.

Referring to FIG. 2, a backlight module 20, in accordance with a second embodiment, is fixed in a back plate 21. The back plate 21 defines four engagement grooves 210. In this embodiment, the four engagement grooves 210 serve as four fixing portions and are evenly distributed at opposite sides of the back plate 21. Each of the engagement grooves 210 is substantially rectangular.

The backlight module 20 includes a light guide plate 22 and a light source assembly 24. The light source assembly 24 is adjacent to and spaced apart from the light guide plate 22.

The light guide plate 22 includes a light incident surface 222, a light output surface 224, a reflective surface (not shown), a first side surface 226, and a second side surface 228. The light output surface 224 and the reflective surface are positioned at opposite sides of the light guide plate 22, and the light output surface 224 and the reflective surface are connected to the light incident surface 222. The first side surface 226 and the second side surface 228 are positioned at opposite sides of the light guide plate 22, and the first side surface 226 and the second side surface 228 are interconnected between the light output surface 224 and the reflective surface.

The light output surface 224 includes a main body 2240 and four protrusions 2242 severing as four locating portions. The main body 2240 is substantially rectangular and corresponds to a display area viewed by a user. The four protrusions 2242 correspond to the four engagement grooves 210. In detail, the four protrusions 2242 are rectangular and extend outwardly from the main body 2240. Two of the four protrusions 2242 extend from the first side surface 226, and the remaining two protrusions 2242 extend from the second side surface 228. The four protrusions 2242 engage in the corresponding engagement grooves 210 so that the light guide plate 22 is fixed to the back plate 21.

Eight blank areas 2244 are formed on the main body 2240 adjacent to the four locations where the four protrusions 2242 engage in the corresponding engagement grooves 210. A plurality of microstructures 2246 are formed on the rest area excluding the blank areas 2244 of the main body 2240. In detail, the blank areas 2244 are flat plate areas, and have no microstructures 2246 formed thereon. Each of the blank areas 2244 is substantially quadrilateral. Every two blank areas 2244 correspond to an engagement groove 210 and a protrusion 2242. The every two blank areas 2244 are symmetrical relative to the corresponding protrusion 2242. The area between the every two blank areas 2244 includes a first trapezoidal portion 2247 and a second trapezoidal portion 2248 connected to the first trapezoidal portion 2247. The first trapezoidal portion 2247 is connected to the corresponding protrusion 2242. The first trapezoidal portion 2247 is interconnected between the corresponding protrusion 2242 and the second trapezoidal portion 2248. In particular, the long side of the first trapezoidal portion 2247 is connected to the corresponding protrusion 2242. The short side of the first trapezoidal portion 2247 is connected to the short side of the second trapezoidal portion 2248. Distance between an outmost side of one of the every two blank areas 2244 and an outmost side of the other one of the every two blank areas 2244 is larger than the width of the corresponding engagement groove 210. A plurality of microstructures 2246 are formed on the four protrusions 2242. In this embodiment, the microstructures 2246 are prisms which are substantially parallel to each other along the lengthwise direction of the light output surface 224. The cross-section of each of the prisms 2246 along a direction perpendicular to the light output surface 224 is substantially triangular or semicircular.

The structure and the arrangement of the light source assembly 24 of this embodiment are the same as those of the light source assembly 14 of the first embodiment. The principle and advantages of the backlight module 20 of this embodiment are the same as those of the backlight module 10 of the first embodiment. The methods for manufacturing the light guide plate 22 of this embodiment are the same as the methods for manufacturing the light guide plate 12 of the first embodiment.

The Third Embodiment

Figure 3:
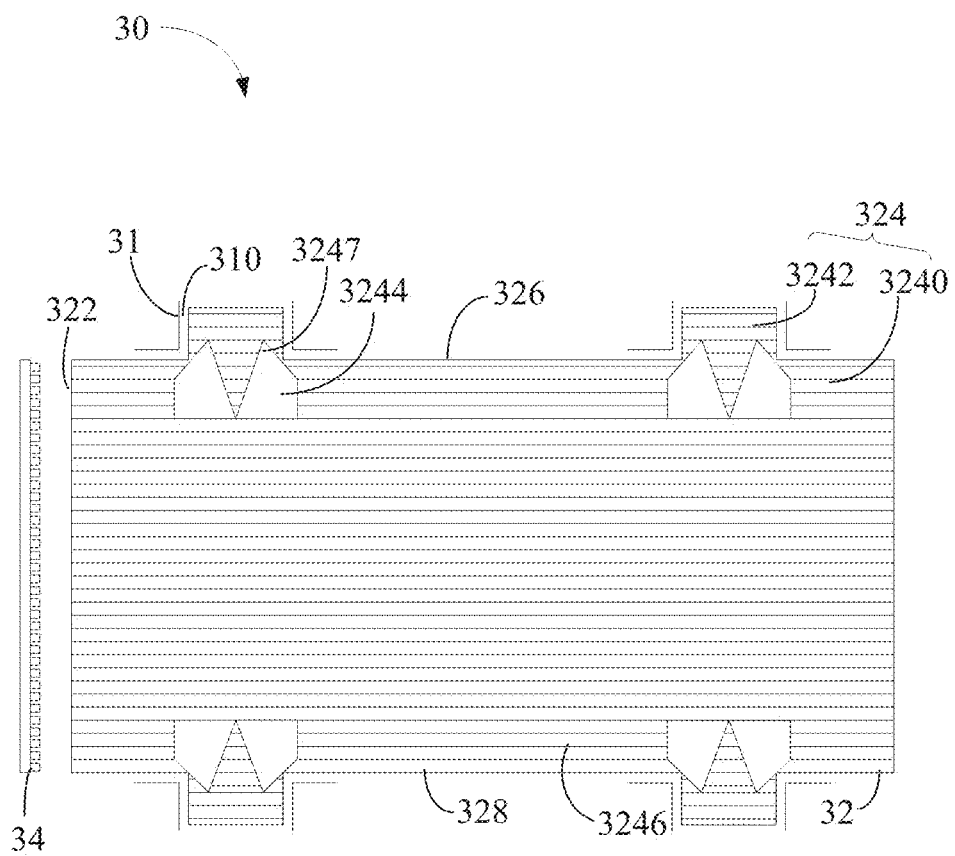
FIG. 3 is a schematic view of a backlight module in accordance with a third exemplary embodiment of the present invention.

Referring to FIG. 3, a backlight module 30, in accordance with a third embodiment, is fixed in a back plate 31. The back plate 31 defines four engagement grooves 310. In this embodiment, the four engagement grooves 310 serve as four fixing portions and are evenly distributed at opposite sides of the back plate 31. Each of the engagement grooves 310 is substantially rectangular.

The backlight module 30 includes a light guide plate 32 and a light source assembly 34. The light source assembly 34 is adjacent to and spaced apart from the light guide plate 32.

The light guide plate 32 includes a light incident surface 322, a light output surface 324, a reflective surface (not shown), a first side surface 326, and a second side surface 328. The light output surface 324 and the reflective surface are positioned at opposite sides of the light guide plate 32, and the light output surface 324 and the reflective surface are connected to the light incident surface 322. The first side surface 326 and the second side surface 328 are positioned at opposite sides of the light guide plate 32, and the first side surface 326 is substantially parallel to the second side surface 328. The first side surface 326 and the second side surface 328 are interconnected between the light output surface 324 and the reflective surface.

The light output surface 324 includes a main body 3240 and four protrusions 3242 serving as four locating portions. The main body 3240 is substantially rectangular and corresponds to a display area viewed by a user. The four protrusions 3242 correspond to the four engagement grooves 310. In detail, the four protrusions 3242 are substantially rectangular and extend outwardly from the main body 3240. Two of the four protrusions 3242 extend from the first side surface 326, and the remaining two protrusions 3242 extend from the second side surface 328. The four protrusions 3242 engage in the corresponding engagement grooves 310 so that the light guide plate 32 is fixed to the back plate 31.

Eight blank areas 3244 are formed on the main body 3240 adjacent to the four locations where the four protrusions 3242 engage in the corresponding engagement grooves 310. A plurality of microstructures 3246 are formed on the rest area excluding the blank areas 3244 of the main body 3240. In detail, the blank areas 3244 are flat plate areas, and have no microstructures 3246 formed thereon. Every two blank areas 3244 correspond to an engagement groove 310 and a protrusion 3242. The every two blank areas 3244 are symmetrical relative to the corresponding protrusion 3242. The area between the every two blank areas 3244 is substantially a triangular area. A bottom edge of the triangular area is connected to the corresponding protrusion 3242. Distance between an outmost side of one of the every two blank areas 3244 and an outmost side of the other one of the every two blank areas 3244 is larger than the width of the corresponding engagement groove 310. A plurality of microstructures 3246 are formed on each of the four protrusions 3242 to define two triangular blank areas 3247 in each protrusion 3242. The blank areas 3247 are connected to the blank areas 3244, respectively. In this embodiment, the microstructures 3246 are prisms which are substantially parallel to each other along the lengthwise direction of the light output surface 324. The cross-section of each of the prisms along a direction perpendicular to the light output surface 324 is substantially triangular or semicircular.

The structure and the arrangement of the light source assembly 34 of this embodiment are the same as those of the light source assembly 14 of the first embodiment. The principle and advantages of the backlight module 30 of this embodiment are the same as those of the backlight module 10 of the first embodiment. The methods for manufacturing the light guide plate 32 of this embodiment are the same as the methods for manufacturing the light guide plate 12 of the first embodiment.

The Fourth Embodiment

Figure 4:
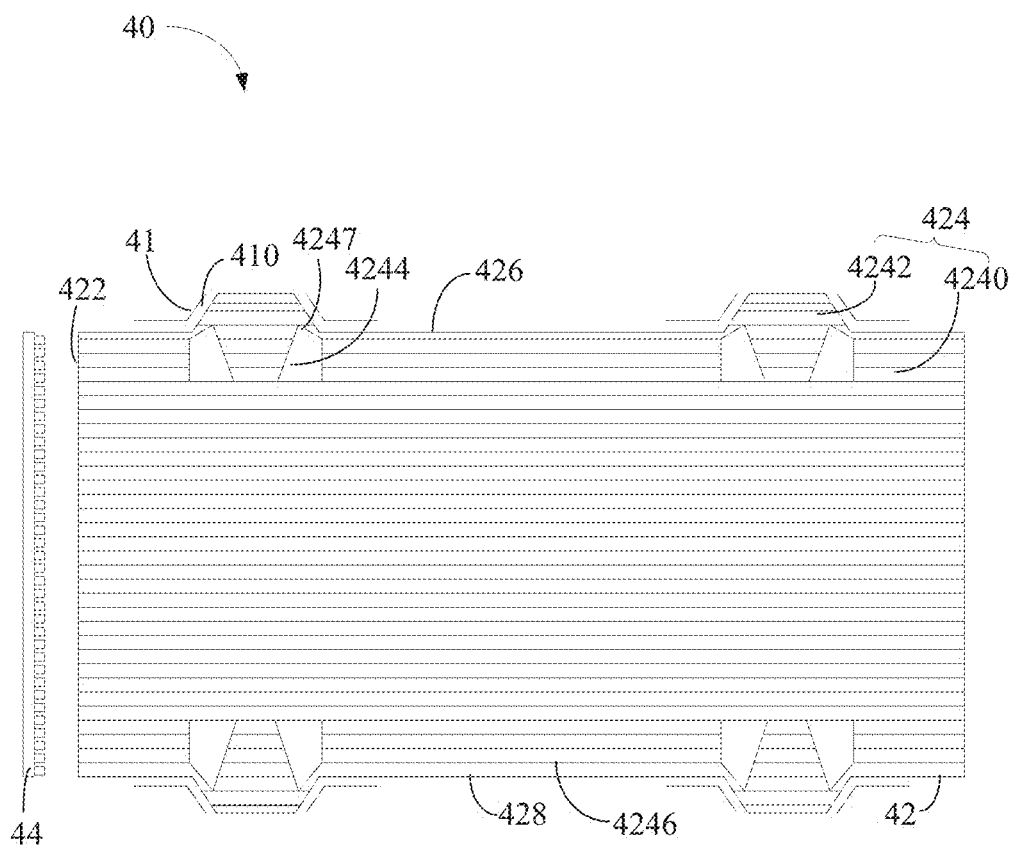
FIG. 4 is a schematic view of a backlight module in accordance with a fourth exemplary embodiment of the present invention.

Referring to FIG. 4, a backlight module 40, in accordance with a fourth embodiment, is fixed in a back plate 41. The back plate 41 defines four engagement grooves 410. In this embodiment, the four engagement grooves 410 serve as four fixing portions and are evenly distributed at opposite sides of the back plate 41. Each of the engagement grooves 410 is substantially trapezoid.

The backlight module 40 includes a light guide plate 42 and a light source assembly 44. The light source assembly 44 is adjacent to and spaced apart from the light guide plate 42.

The light guide plate 42 includes a light incident surface 422, a light output surface 424, a reflective surface (not shown), a first side surface 426, and a second side surface 428. The light output surface 424 and the reflective surface are positioned at opposite sides of the light guide plate 42, and the light output surface 424 and the reflective surface are connected to the light incident surface 422. The first side surface 426 and the second side surface 428 are positioned at opposite sides of the light guide plate 42, and the first side surface 426 is substantially parallel to the second side surface 428. The first side surface 426 and the second side surface 428 are interconnected between the light output surface 424 and the reflective surface.

The light output surface 424 includes a main body 4240 and four protrusions 4242 serving as four locating portions. The main body 4240 is substantially rectangular and corresponds to a display area viewed by a user. The four protrusions 4242 correspond to the four engagement grooves 410. In detail, the four protrusions 4242 are substantially trapezoid and extend outwardly from the main body 4240. Two of the four protrusions 4242 extend from the first side surface 426, and the remaining two protrusions 4242 extend from the second side surface 428. The four protrusions 4242 engage in the corresponding engagement grooves 410 so that the light guide plate 42 is fixed to the back plate 41.

Eight blank areas 4244 are formed on the main body 4240 adjacent to the four locations where the four protrusions 4242 engage in the corresponding engagement grooves 410. A plurality of microstructures 4246 are formed on the rest area excluding the blank areas 4244 of the main body 4240. In detail, the blank areas 4244 are flat plate areas, and have no microstructures 4246 formed thereon. Every two blank areas 4244 correspond to an engagement groove 410 and a protrusion 4242. The every two blank areas 4244 are symmetrical relative to the corresponding protrusion 4242. The area between the every two blank areas 4244 is substantially a trapezoid. The long side of the trapezoid is connected to the corresponding protrusion 4242. Distance between an outmost side of one of the every two blank areas 4244 and an outmost side of the other one of the every two blank areas 4244 is larger than the width of the corresponding engagement groove 410. A plurality of microstructures 4246 are formed on each of the four protrusions 4242 to define two triangular blank areas 4247 in each protrusion 4242. The blank areas 4247 are connected to the blank areas 4244, respectively. In this embodiment, the microstructures 4246 are prisms which are substantially parallel to each other along the lengthwise direction of the light output surface 424. The cross-section of each of the prisms along a direction perpendicular to the light output surface 424 is substantially triangular or semicircular.

The structure and the arrangement of the light source assembly 44 of this embodiment are the same as those of the light source assembly 14 of the first embodiment. The principle and advantages of the backlight module 40 of this embodiment are the same as those of the backlight module 10 of the first embodiment. The methods for manufacturing the light guide plate 42 of this embodiment are the same as the methods for manufacturing the light guide plate 12 of the first embodiment.

The Fifth Embodiment

Figure 5:
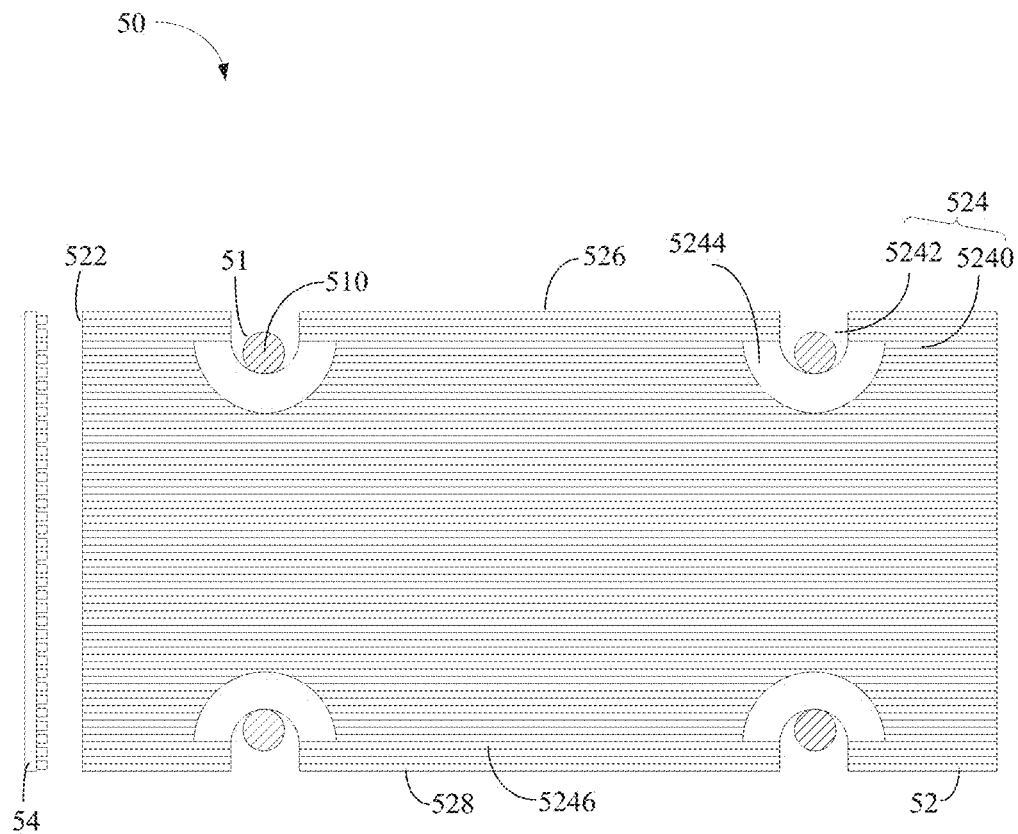
FIG. 5 is a schematic view of a backlight module in accordance with a fifth exemplary embodiment of the present invention.

Referring to FIG. 5, a backlight module 50, in accordance with a fifth embodiment, is fixed in a back plate 51. The back plate 51 includes four protrusions 510. In this embodiment, the four protrusions 510 serve as four fixing portions and are evenly distributed at opposite sides of the back plate 51. The cross-section of each of the protrusions 510 is substantially circular.

The backlight module 50 includes a light guide plate 52 and a light source assembly 54. The light source assembly 54 is adjacent to and spaced apart from the light guide plate 52.

The light guide plate 52 includes a light incident surface 522, a light output surface 524, a reflective surface (not shown), a first side surface 526, and a second side surface 528. The light output surface 524 and the reflective surface are positioned at opposite sides of the light guide plate 52, and the light output surface 524 and the reflective surface are connected to the light incident surface 522. The first side surface 526 and the second side surface 528 are positioned at opposite sides of the light guide plate 52, and the first side surface 526 is substantially parallel to the second side surface 528. The first side surface 526 and the second side surface 528 are interconnected between the light output surface 524 and the reflective surface.

The light output surface 524 includes a main body 5240 and defines four engagement grooves 5242 serving as four locating portions. The main body 5240 is substantially rectangular and corresponds to a display area viewed by a user. The four engagement grooves 5242 correspond to the four protrusions 510. In detail, the four engagement grooves 5242 are substantially U-shaped and are recessed inward. Two of the four engagement grooves 5242 are defined in the first side surface 526, and the remaining two engagement grooves 5242 are defined in the second side surface 528. The four protrusions 510 engage in the corresponding engagement grooves 5242 so that the light guide plate 52 is fixed to the back plate 51.

Four blank areas 5244 are formed on the main body 5240 respectively adjacent to the four locations where the four protrusions 510 engage in the corresponding engagement grooves 5242. A plurality of microstructures 5246 are formed on the rest area excluding the blank areas 5244 of the main body 5240. In detail, the blank areas 5244 are flat plate areas, and have no microstructures 5246 formed thereon. In this embodiment, each of the blank areas 5244 is substantially a semicircle ring-like, and corresponds to an engagement groove 5242 and a protrusion 510. Each of the blank areas 5244 directly faces the corresponding engagement groove 5242. The outer diameter of each blank area 5244 is larger than the largest width of the corresponding engagement groove 5242. The microstructures 5246 are prisms which are substantially parallel to each other along the lengthwise direction of the light output surface 524. The cross-section of each of the prisms along a direction perpendicular to the light output surface 524 is substantially triangular or semicircular.

The structure and the arrangement of the light source assembly 54 of this embodiment are the same as those of the light source assembly 14 of the first embodiment. The principle and advantages of the backlight module 50 of this embodiment are the same as those of the backlight module 10 of the first embodiment. The methods for manufacturing the light guide plate 52 of this embodiment are the same as the methods for manufacturing the light guide plate 12 of the first embodiment.

The Sixth Embodiment

Figure 6:
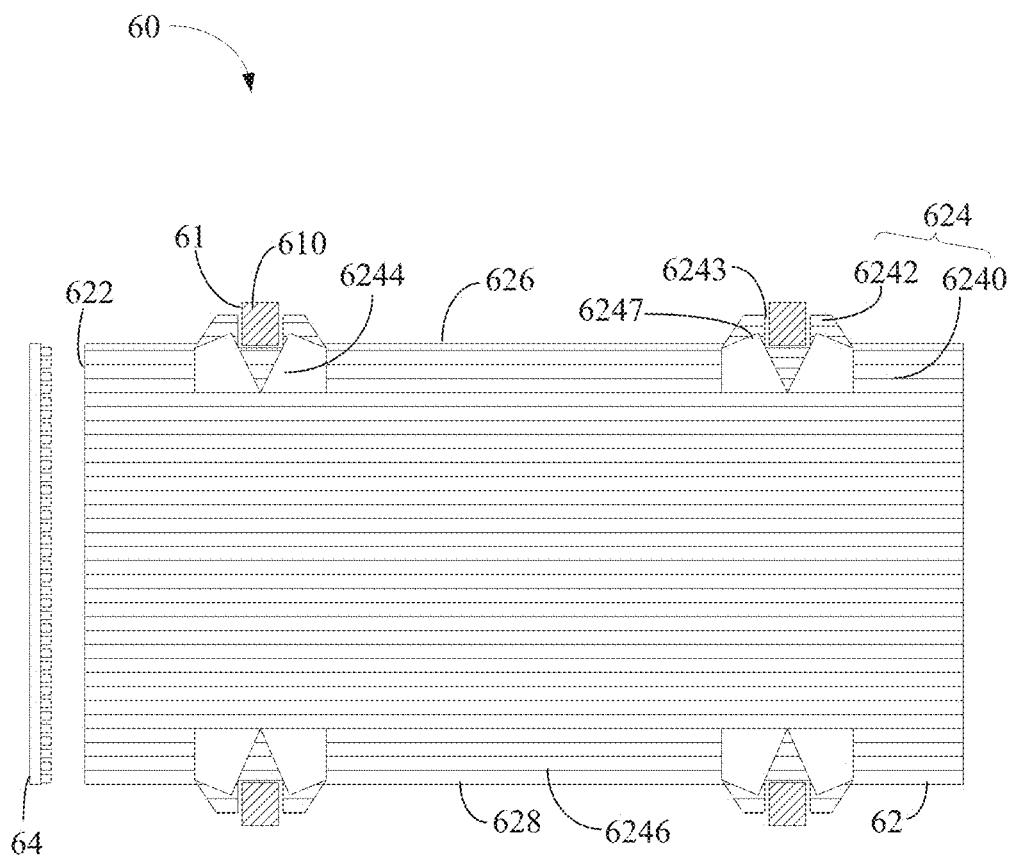
FIG. 6 is a schematic view of a backlight module in accordance with a sixth exemplary embodiment of the present invention.

Referring to FIG. 6, a backlight module 60, in accordance with a sixth embodiment, is fixed in a back plate 61. The back plate 61 includes four protrusions 610. In this embodiment, the four protrusions 610 serve as four fixing portions and are evenly distributed at opposite sides of the back plate 61. The cross-section of each of the protrusions 610 is substantially rectangular.

The backlight module 60 includes a light guide plate 62 and a light source assembly 64. The light source assembly 64 is adjacent to and spaced apart from the light guide plate 62.

The light guide plate 62 includes a light incident surface 622, a light output surface 624, a reflective surface (not shown), a first side surface 626, and a second side surface 628. The light output surface 624 and the reflective surface are positioned at opposite sides of the light guide plate 62, and the light output surface 624 and the reflective surface are connected to the light incident surface 622. The first side surface 626 and the second side surface 628 are positioned at opposite sides of the light guide plate 62, and the first side surface 626 is substantially parallel to the second side surface 628. The first side surface 626 and the second side surface 628 are interconnected between the light output surface 624 and the reflective surface.

The light output surface 624 includes a main body 6240 and four trapezoidal blocks 6242 serving as four locating portions. Each of the blocks 6242 defines an engagement groove 6243. The main body 6240 is substantially rectangular and corresponds to a display area viewed by a user. The four blocks 6242 correspond to the four protrusions 610. The blocks 6242 extend outwardly from the main body 6240. In detail, two of the four blocks 6242 extend from the first side surface 626, and the remaining two blocks 6242 extend from the second side surface 628. The four protrusions 610 engage in the corresponding engagement groove 6243 so that the light guide plate 62 is fixed to the back plate 61.

Eight blank areas 6244 are formed on the main body 6240 adjacent to the four locations where the four protrusions 610 engage in the corresponding engagement grooves 6243. A plurality of microstructures 6246 are formed on the rest area excluding the blank areas 6244 of the main body 6240. In detail, the blank areas 6244 are flat plate areas, and have no microstructures 6246 formed thereon. Every two blank areas 6244 correspond to an engagement groove 6243 and a protrusion 610. The every two blank areas 6244 are symmetrical relative to the corresponding engagement groove 6243. The area between the every two blank areas 6244 is substantially a triangular area. A bottom edge of the triangular area is connected to the corresponding block 6242. Distance between an outmost side of one of the every two blank areas 6244 and an outmost side of the other one of the every two blank areas 6244 is larger than the width of the corresponding engagement groove 6243. A plurality of microstructures 6246 are formed on each of the four blocks 6242 to define two triangular blank areas 6247 in each four block 6242. The blank areas 6247 are connected to the blank areas 6244, respectively. In this embodiment, the microstructures 6246 are prisms which are substantially parallel to each other along the lengthwise direction of the light output surface 624. The cross-section of each of the prisms along a direction perpendicular to the light output surface 624 is substantially triangular or semicircular.

The structure and the arrangement of the light source assembly 64 of this embodiment are the same as those of the light source assembly 14 of the first embodiment. The principle and advantages of the backlight module 60 of this embodiment are the same as those of the backlight module 10 of the first embodiment. The methods for manufacturing the light guide plate 62 of this embodiment are the same as the methods for manufacturing the light guide plate 12 of the first embodiment.

The Seventh Embodiment

Figure 7:
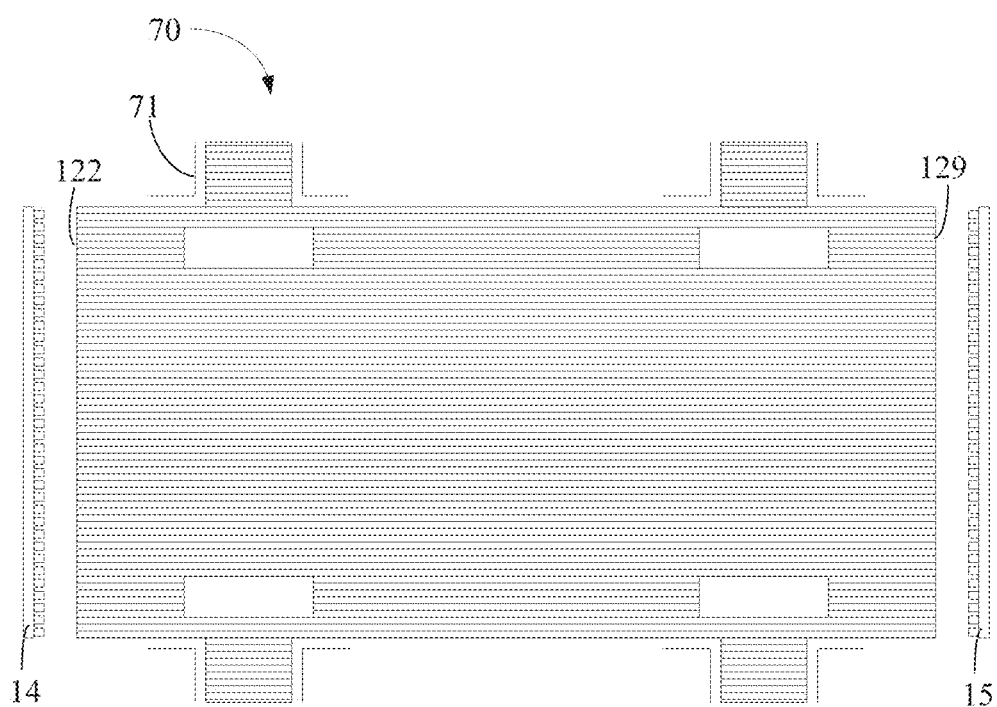
FIG. 7 is a schematic view of a backlight module in accordance with a seventh exemplary embodiment of the present invention.

Referring to FIG. 7, a backlight module 70, in accordance with a seventh embodiment, is fixed in a back plate 71. The structure of the back plate 71 is the same as the back plate 11 of the first embodiment. The differences between the backlight module 70 of this embodiment and the backlight module 10 of the first embodiment of the first embodiment are that a side surface of the light guide plate, which is opposite to the light incident surface 122, is designed as another light incident surface 129. Another light source assembly 15 the same as the light source assembly 14 is added. The light source assembly 15 directly faces the light incident surface 129 and emits light toward the light guide plate. The principle and advantages of the backlight module 70 of this embodiment are similar to those of the backlight module 10 of the first embodiment. Furthermore, the backlight module 70 can be used in a large size LCDs. It is understood that the another light incident surface 129 and the another light source assembly 15 can be used to improve the backlight module of the second through the sixth embodiment.

What is said above are only preferred examples of present invention, not intended to limit the present invention, any modifications, equivalent substitutions and improvements etc. made within the spirit and principle of the present invention, should be included in the protection range of the present invention.

What is claimed is:

1. A light guide plate fixed to a back plate with a plurality of fixing portions, comprising:
a light incident surface;
a reflective surface connected with the light incident surface; and
a light output surface opposite to the reflective surface and connected with the light incident surface, the light output surface comprising a main body and a plurality of locating portions mounted on the main body, the locating portions corresponding to the fixing portions, the locating portions mating with the corresponding fixing portions thereby fixing the light guide plate to the back plate, a blank area formed on the main body at each location where each of the locating portions mating with the corresponding fixing portion, and a plurality of microstructures formed on the rest area excluding the blank areas in the main body, wherein the fixing portions are engagement grooves, the locating portions are protrusions extending outwardly from opposite sides of the main body, the protrusions engage in the corresponding engagement grooves thereby fixing the light guide plate to the back plate, the engagement grooves, the protrusions, and blank areas are substantially rectangular, each of the blank area corresponds to an engagement groove and a protrusion, each of the blank areas directly faces the corresponding engagement groove, and is spaced apart from the corresponding protrusion, and the length of each of the blank areas is larger than the width of the corresponding engagement groove, and a plurality of microstructures are formed on the protrusions.

2. The light guide plate of claim 1, wherein the microstructures are prisms which are substantially parallel to each other along the lengthwise direction of the light output surface.

3. The light guide plate of claim 2, wherein the cross-section of each of the prisms along a direction perpendicular to the light output surface is substantially triangular or semicircular.

4. A backlight module comprising:
a light guide plate fixed to a back plate, the back plate comprising a plurality of fixing portions, the light guide plate comprising:
a light incident surface;
a reflective surface connected with the light incident surface; and a light output surface opposite to the reflective surface and connected with the light incident surface, the light output surface comprising a main body and a plurality of locating portions mounted on the main body, the locating portions corresponding to the fixing portions, the locating portions mating with the corresponding fixing portions thereby fixing the light guide plate to the back plate, a blank area formed on the main body at each location where each of the locating portions mating with the corresponding fixing portion, and a plurality of microstructures formed on the rest area excluding the blank areas in the main body; and a light source assembly being adjacent to and spaced apart from the light guide plate, the light source assembly directly facing and emitting light toward the light incident surface, wherein the fixing portions are engagement grooves, the locating portions are protrusions extending outwardly from opposite sides of the main body, the protrusions engage in the corresponding engagement grooves thereby fixing the light guide plate to the back plate, the engagement grooves, the protrusions, and blank areas are substantially rectangular, each of the blank area corresponds to an engagement groove and a protrusion, each of the blank areas directly faces the corresponding engagement groove, and is spaced apart from the corresponding protrusion, and the length of each of the blank areas is larger than the width of the corresponding engagement groove, and a plurality of microstructures are formed on the protrusions.

5. The backlight module of claim 4, wherein the microstructures are prisms which are substantially parallel to each other along the lengthwise direction of the light output surface.

6. The backlight module of claim 5, wherein the cross-section of each of the prisms along a direction perpendicular to the light output surface is substantially triangular or semicircular.

7. The backlight module of claim 5, wherein the light source assembly comprises a circuit board and a plurality of light emitting diodes (LED) mounted on the circuit board, the LEDs are arranged in a straight line and are spaced apart from each other, the LEDs directly face and emit light toward the light guide plate through the light incident surface, and the straight line is substantially perpendicular to the lengthwise direction of the prisms.

8. A light guide plate fixed to a back plate with a plurality of fixing portions, comprising:
   a light incident surface;
   a reflective surface connected with the light incident surface; and
   a light output surface opposite to the reflective surface and connected with the light incident surface, the light output surface comprising a main body and a plurality of locating portions mounted on the main body, the locating portions corresponding to the fixing portions, the locating portions mating with the corresponding fixing portions thereby fixing the light guide plate to the back plate, a blank area formed on the main body at each location where each of the locating portions mating with the corresponding fixing portion, and a plurality of microstructures formed on the rest area excluding the blank areas in the main body, wherein the fixing portions are engagement grooves, the locating portions are protrusions extending outwardly from opposite sides of the main body, the protrusions engage in the corresponding engagement grooves thereby fixing the light guide plate to the back plate, the engagement grooves and the protrusions are substantially rectangular, blank areas are substantially quadrilateral, every two blank areas correspond to an engagement groove and a protrusion, the every two blank areas are symmetrical relative to the corresponding protrusion, the area between the every two blank areas comprises a first trapezoidal portion connected with the corresponding protrusion and a second trapezoidal portion connected to the first trapezoidal portion, distance between an outmost side of one of the every two blank areas and an outmost side of the other one of the every two blank areas is larger than the width of the corresponding engagement groove, and a plurality of microstructures are formed on the protrusions.

* * * * *